Figure 1:
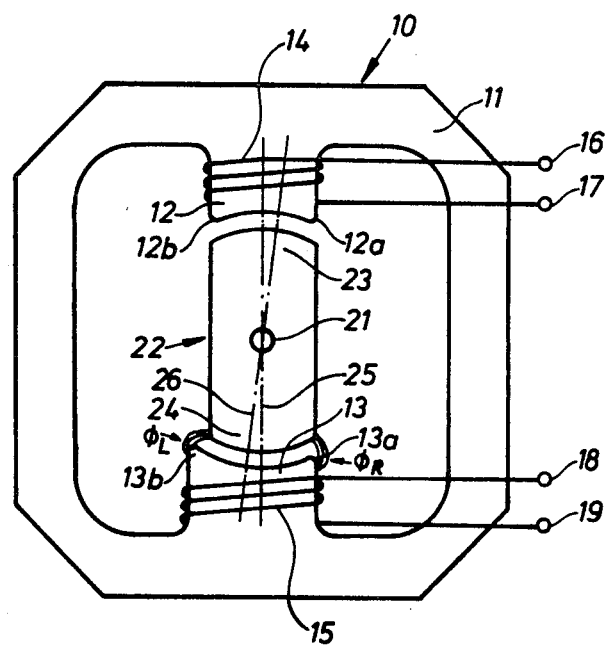

United States Patent [19]

Morén et al.

[11] Patent Number: 4,467,233

[45] Date of Patent: Aug. 21, 1984

[54] SELF STARTING RELUCTANCE MOTOR

[75] Inventors: Lars G. Morén, Huddinge; Ulf P. Berg, Hägersten, both of Sweden

[73] Assignee: Aktiebolaget Electrolux, Stockholm, Sweden

[21] Appl. No.: 533,283

[22] Filed: Sep. 19, 1983

[30] Foreign Application Priority Data

Oct. 1, 1982 [SE] Sweden .................. 8205623

[51] Int. Cl.³ .................................. H02K 19/00
[52] U.S. Cl. ............................. 310/162; 310/254; 310/68 R; 310/164; 318/778
[58] Field of Search ......... 310/41, 49, 68 R, 162–164, 310/254, 179, 180; 318/701, 716, 728, 778, 254

[56] References Cited

U.S. PATENT DOCUMENTS 2,483,539 10/1949 Hansen.
3,032,670 5/1962 Fritz .................................. 310/164
3,375,384 3/1968 Thees .................................. 310/162
3,475,630 10/1969 Heinzen ........................... 310/164 X
3,604,961 9/1971 Saldinger ............................ 310/254

Primary Examiner—Mark O. Budd
Attorney, Agent, or Firm—Alfred E. Miller

[57] ABSTRACT

A reluctance motor comprises a rotor (22) of soft magnetic material with two diametrically opposed poles (23,24) of equal size. The motor further includes a stator which in a corresponding way is provided with two poles (12,13). The stator poles (12,13) have windings (14,15) which can be activated separately. Further the stator poles are so designed that the radial line of symmetry (26) of one stator pole (13) forms an angle to the radial line of symmetry (25) of the other stator pole (12). Means are provided which on start drive the two windings alternately and in continuous operation drive them simultaneously.

9 Claims, 2 Drawing Figures

SELF STARTING RELUCTANCE MOTOR

This invention relates to a reluctance motor of the type referred to in the introductory part of the following claim 1.

A reluctance motor with two stator and rotor poles, respectively, has four motor positions in which it is not subject to any driving torque. In two of these positions the rotor poles are exactly opposite the stator poles and in the other two positions the rotor poles are right between the stator poles. The first-mentioned positions are called stable magnetic positions of equilibrium in which the motor cannot be caused to start rotating if the rotor should have stopped in either of these positions. The latter positions are called unstable magnetic positions of equilibrium in which the motor can mostly be caused to rotate.

The object of the invention is to provide a reluctance motor of the type referred to which is so designed that the motor can be caused to rotate even if the rotor should be in a stable position of equilibrium. The object is achieved in a reluctance motor having the characterizing features defined in the following claims.

Figure 2:
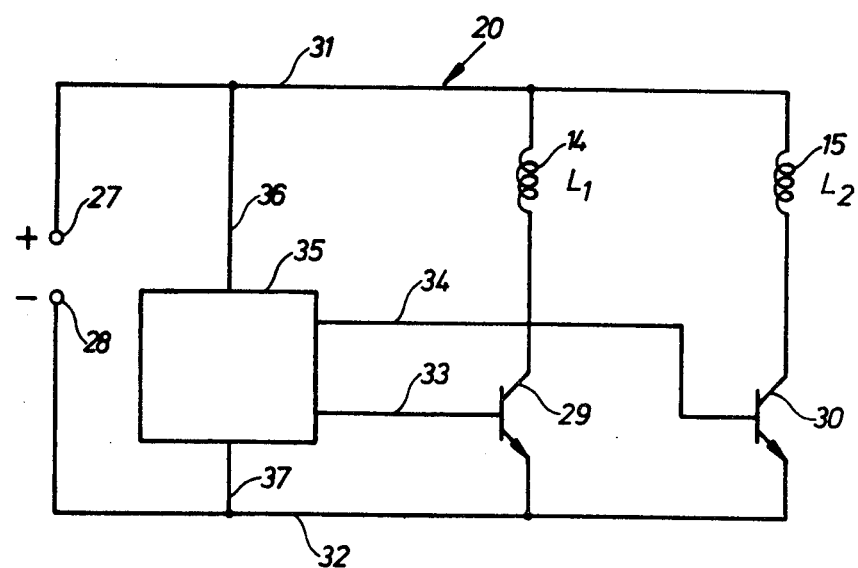

The invention will now be described by way of example with reference to the accompanying drawing in which FIG. 1 shows a reluctance motor in accordance with the invention and FIG. 2 is a circuit diagram of a control device for the motor shown in FIG. 1.

The motor in general as illustrated in FIG. 1 is denoted by 10. The motor comprises a stator 11 with two poles 12, 13 provided with windings 14, 15. The ends of the respective winding are extended to form terminals 16, 17 and 18, 19, respectively, by way of which the windings are connected to a control device 20, shown in FIG. 2, for the motor. A rotor 22 with two symmetrically disposed poles 23, 24 of equal size is rotatably arranged on a shaft 21 in the air gap between the stator poles.

As seen in FIG. 1, the stator pole 12 has the same peripheral extension as the rotor poles 23, 24 whereas the stator pole 13 is extended to the left. This means that two magnetic positions of equilibrium for the rotor are formed, viz. one which is represented by the line 25 on driving of the stator pole 12 and another one which is represented by the line 26 on driving of the stator pole 13. The opposed edges of the respective stator pole are designated by 12a, 13a and 12b, 13b, respectively. As seen in FIG. 1, the angular positioning of the edges 12a, 13a is symmetrical relative to the line 25, whereas the edges 12b, 13b are asymmetrically disposed relative to the line 25. The shown shapes of the stator and the rotor poles clearly indicate that the line 25 represents the position of equilibrium on driving of the stator pole 12. However, one cannot simply pretend that the position of equilibrium on driving of the stator pole 13 coincides with the line 26. At the first glance it might be possible for the rotor to assume any position located between a position in which the left-hand edge of the rotor pole coincides with the left-hand edge 13b of the stator pole and another position in which the right-hand edge of the rotor pole coincides with the right-hand edge 13a of the stator pole. If, however, the currents in the respective stator winding 14, 15 are of a magnitude causing saturation of the magnetic material in the stator and the rotor pole, respectively, at least in the area adjacent the pole surfaces, the forces generally by leak fluxes will be so great that the rotor is acted upon so as to assume the position of equilibrium represented by the line 26. The leak fluxes, designed by $\phi_L$, $\phi_R$, will hence be equal. The same displacement of the rotor is obtained also in case the stator pole is not brought into saturation, but to ensure that there will be a displacement it is suitable to drive the stator pole at least to a state close to saturation.

The circuit arrangement of FIG. 2 illustrates diagrammatically in what way the motor of FIG. 1 can be conrolled. The windings 14, 15 are connected in parallel to a direct-current source represented by terminals 27, 28. The winding 14 is connected in series with a transistor 29 and the winding 15 in series with a transistor 30. Conductors 31, 32 connect the terminals 27, 28 to the parallel circuits comprising windings and transistors. The transistor bases are via conductors 33, 34 connected to a block 35 representing an electronic control circuit provided to emit control pulses for opening or blocking the transistors. Voltage is supplied to the control circuit 35 via conductors 36, 37 connected to the conductors 31 and 32, respectively.

Briefly, the function of the control device 20 is that the control circuit 35 on start of the motor emits conrol pulses alternately on the conductor 33 and the conductor 34 so that the transistors 29 and 30 are caused to conduct alternately. Thus, also the stator poles will be alternately magnetized so that in one moment the rotor is influenced only by the pole 12 and in the next moment only by the pole 13. Thereby a pendulum effect of the rotor is achieved, and after some current pulses the rotor will be brought into rotation. The control circuit 35 coacts with a position indicator of some known type so that when the motor has started it will control the latter by emitting correctly timed control pulses in dependence on signals from the position indicator. The control circuit is also adapted to coact with the position indicator to ensure that the motor starts rotating in the correct direction.

To describe in detail the starting process of the motor it is first assumed that the rotor has taken a stable magnetic position of equilibrium represented by the line 26. In this case it is of no importance whether the windings 14, 15 are driven simultaneously or separately so that only one winding is connected at each time. This is so, because as soon as the winding 14 receives a current pulse the rotor will be turned to the position represented by the line 25, and this initial movement is sufficient for the rotor to be driven into rotation by the following pulses either to both windings simultaneously or alternately.

In the event that the rotor initially has assumed the position shown in FIG. 1 coinciding with the position of equilibrium represented by the line 25, it will be necessary to drive the windings alternately in order to start the motor. In this way, the winding 15 will be supplied with current either by the first control pulse from the control circuit 35 or by the subsequent control pulse, and due to the action of the above-mentioned leak fluxes the rotor will be displaced to the position indicated by the line 26. The required initial movement of the rotor has thus been provided and the following control pulses from the control circuit 35 will bring the rotor 22 into rotation by pendulum action.

We claim:

1. A reluctance motor having a rotor (22) of soft magnetic material with two diametrically opposed poles (23,24) of equal size and a stator with two generally diametrically opposed poles (12,13), characterized in that the stator poles (12,13) have windings (14,15) which can be activated separately and in that the stator poles are so designed that the radial line of symmetry (26) of one stator pole (13) forms an angle to the radial line of symmetry (25) of the other stator pole (12), means further being provided which on start drive the two stator windings (14,15) alternately and in continuous operation drive the windings simultaneously.

2. A reluctance motor according to claim 1, characterized in that the angle is preferably less than 20°.

3. A reluctance motor according to claim 1 or claim 2, characterized in that one (13) of the stator poles has greater peripheral extension than the other stator pole (12), the edges (12a,13a) of the respective stator pole (12,13) which are facing one another having an angular positioning which is symmetrical relative to the radial line of symmetry (25) of the shorter one of the stator poles, whereas the edges (12b,13b) at the opposite side of the pole are asymmetrically positioned.

4. A reluctance motor according to claim 3, characterized in that each rotor pole (23,24) has a peripheral extension which coincides with the extension of the shorter one (12) of the stator poles.

5. In a reluctance motor having a rotor of soft magnetic material with a pair of diametrically opposed poles of equal size and a stator having two generally diametrically opposed poles, and windings on said stator poles, the improvement wherein said stator poles having different widths, in the circumferential direction of the motor, with the radial line of symmetry of one stator pole being displaced from the radial line of symmetry of the other stator pole, and means for separately controlling the energization of the two stator windings.

6. The reluctance motor of claim 5 wherein the angle between the radial lines of symmetry of the stator poles is less than 20°.

7. The reluctance motor of claim 5 wherein the circumferential width of the poles of said rotor is equal to the circumferential width of the narrower of said stator poles.

8. The reluctance motor of claim 5 wherein the circumferential edge of the circumferentially wider of said stator poles is displaced from the radial line of symmetry of the narrower of said stator poles the same distance as both of the circumferentially edges of said narrower of said stator poles.

9. The reluctance motor of claim 5 wherein said means for energizing said windings comprise circuit means connected to alternately energize said windings during the startup and simultaneously energize said windings during continuous operation of said motor.

* * * * *